US008213438B2

(12) United States Patent
Larsen et al.

(10) Patent No.: US 8,213,438 B2
(45) Date of Patent: Jul. 3, 2012

(54) DATA TRANSPORT PROTOCOL FOR A MULTI-STATION NETWORK

(75) Inventors: James David Larsen, Woodinville, WA (US); Paul Jonathan Rodman, Kirkland, WA (US)

(73) Assignee: IWICS Inc., Bothell, WA (US)

( * ) Notice: Subject to any disclaimer, the term of this patent is extended or adjusted under 35 U.S.C. 154(b) by 1028 days.

(21) Appl. No.: 10/875,995

(22) Filed: Jun. 24, 2004

(65) Prior Publication Data

US 2005/0135242 A1 Jun. 23, 2005

Related U.S. Application Data

(60) Provisional application No. 60/531,309, filed on Dec. 19, 2003.

(51) Int. Cl.
*H04L 12/56* (2006.01)
(52) U.S. Cl. ........................................ 370/400; 455/500
(58) Field of Classification Search .................. 370/345, 370/349, 350, 394
See application file for complete search history.

(56) References Cited

U.S. PATENT DOCUMENTS

| 6,097,703 A * | 8/2000 | Larsen et al. ................. 370/254 |
| 2003/0174690 A1* | 9/2003 | Benveniste .................... 370/350 |
| 2004/0032853 A1* | 2/2004 | D'Amico et al. ............. 370/349 |

* cited by examiner

*Primary Examiner* — Seema S. Rao
*Assistant Examiner* — Wanda Russell
(74) *Attorney, Agent, or Firm* — Ladas & Parry LLP

(57) ABSTRACT

The invention relates to a method of operating a communication network, the network comprising a plurality of stations which are able to transmit data to and receive data from one another so that a message comprising a plurality of data packets is sent from an originating station to a destination station via at least one opportunistically selected intermediate station. The method makes use of probe signals transmitted from each station on a selected probing channel to which other stations respond to indicate their availability as destination or intermediate stations. A Request to Send message is sent, with a Clear to Send message returned by an available station. The station with data to send opportunistically selects an available station and the selected station uses a Packet Acknowledge message to confirm successful reception of the transmitted data packet. An End-to-End Acknowledge message is sent by the originating station, directly or indirectly, to confirm receipt of said data packets.

32 Claims, 8 Drawing Sheets

DATA TRANSPORT PROTOCOL FOR A MULTI-STATION NETWORK

BACKGROUND OF THE INVENTION

THIS invention relates to a method of operating a multi-station communication network of the general kind described in International Patent applications nos. WO 96/19887 and WO 98/56140. In particular, the invention relates to a data transport protocol for use by such a network.

Networks of the kind referred to above can be utilised commercially, with users being subscribers who are billed for their use of the network. Alternatively, networks of this kind may be utilised by security forces such as police or military forces.

A further application for networks of the kind referred to is in Wireless Local Area Networks (WLANs), where a wireless network can be combined with conventional network structures to service fixed and mobile network users. Such networks are usually but not necessarily computer networks.

SUMMARY OF THE INVENTION

According to the invention there is provided a communication network comprising a plurality of client stations each able to transmit and receive data so that the network can transmit a message comprising a plurality of data packets from an originating client station to a destination client station via at least one opportunistically selected intermediate client station, and wherein the network further comprises a plurality of gateways arranged to serve as access points to the network for client stations;
a plurality of seed stations with which client stations can communicate, each seed station being in communication with at least one gateway, the plurality of seed stations extending the effective connectivity range of the client stations;
and at least one subscriber network manager for monitoring the client stations;

wherein each client station is adapted to:
define at least one probing channel, distinct from at least one data channel;
select, at each client station, a probing channel for the transmission of probe signals to other client stations;
transmit probe signals from each client station on the selected probing channel, other client stations which receive the first probe signals from a probing client station responding directly or indirectly to thereby indicate to the probing client station their availability as destination or intermediate client stations;
from a client station with data to send, transmit a probe signal comprising a Request to Send message to other available client stations indicating the wish to send data to a particular destination or destinations;
from an available client station receiving the request to send and that is able to receive data and based on the client stations own availability as destination or intermediate client stations, transmit a probe signal comprising a Clear to Send message, with information indicating its availability as destination or intermediate client stations, to the client station with data to send;
from the client station with data to send, opportunistically select a client station or stations that transmitted a Clear to Send message based on information in their Clear to Send messages and transmit at least one data packet to said selected client station or stations;
from the selected client station receiving the data packet, transmit a Packet Acknowledge message to the client station with data to send to confirm successful reception of the transmitted data packet; and
from a destination client station successfully receiving all data packets of a message from the originating client station, transmit an End-to-End Acknowledge message to the originating client station, directly or via one or more intermediate client stations, to confirm receipt of said data packets.

Each originating client station may be adapted to retain all the data packets of the message until the originating client station receives the End-to-End Acknowledge message from the destination client station.

Each destination client station may further be adapted to retain all the data packets of the message until the destination client station transmits the End-to-End Acknowledge message to the originating client station.

Preferably each client station with data to send is adapted to retain the at least one data packet until the client station with data to send has transmitted the at least one data packet to the selected client station and until the selected client station confirms successful reception of the transmitted data packet.

Each client station transmitting probe signals comprising Clear to Send messages may also be adapted to include in the Clear to Send message information on a data packet it has retained as a client station with data to send.

DESCRIPTION OF AN EMBODIMENT

The present invention relates to a method of operating a multi-station communication network of the kind described in International patent applications nos. WO 96/19887 and WO 98/56140, the contents of which are incorporated herein by reference. In brief, the basic operation of such a network is as follows.

The multi-station network comprises a number of independent stations, which may be fixed or mobile, each of which can transmit and receive data in order to transmit messages from originating stations to destination stations opportunistically via intermediate stations. In order for an originating station to be in a position to send a new message to a destination station via a selected one of several possible intermediate stations, each station must at any time normally be in contact with several other stations. This applies also to the case where stations are required to relay a message from an originating station to a destination station.

In order to do this, each station selects one of a number of possible probing channels to transmit probe signals to other stations. The probe signals contain data identifying the station in question and include details of its connectivity to other stations. Other stations receiving the probe signals respond directly to the probing station or indirectly, via intermediate stations, thereby indicating both to the probing station and other stations their availability as destination or intermediate stations. The probing station evaluates the direct or indirect responses to identify other stations with which it can communicate optimally.

In particular, the stations of the network may monitor the cumulative power required to reach another station, thereby defining a power gradient to the other stations, with stations selecting a route through the network between an originating station and a destination station which optimizes the power gradient. This enables data throughput through the network to be maximized, with minimum interference and contention between stations.

Each station in the network comprises a transceiver able to receive and transmit data from any other station within range. The network could be a packet radio network, as described in the above mentioned International patent applications, but it will be appreciated that the invention is applicable to other networks in which user stations can communicate with one another via intermediate stations in the network.

The above described method of opportunistic data transmission between stations of a network is referred to herein as Opportunity Driven Multiple Access (ODMA).

An embodiment of the present invention will now be described with reference to a WLAN system based on the 802.11b standard. An example of such a WLAN arrangement is illustrated in the schematic diagram of FIG. 1.

Figure 1:
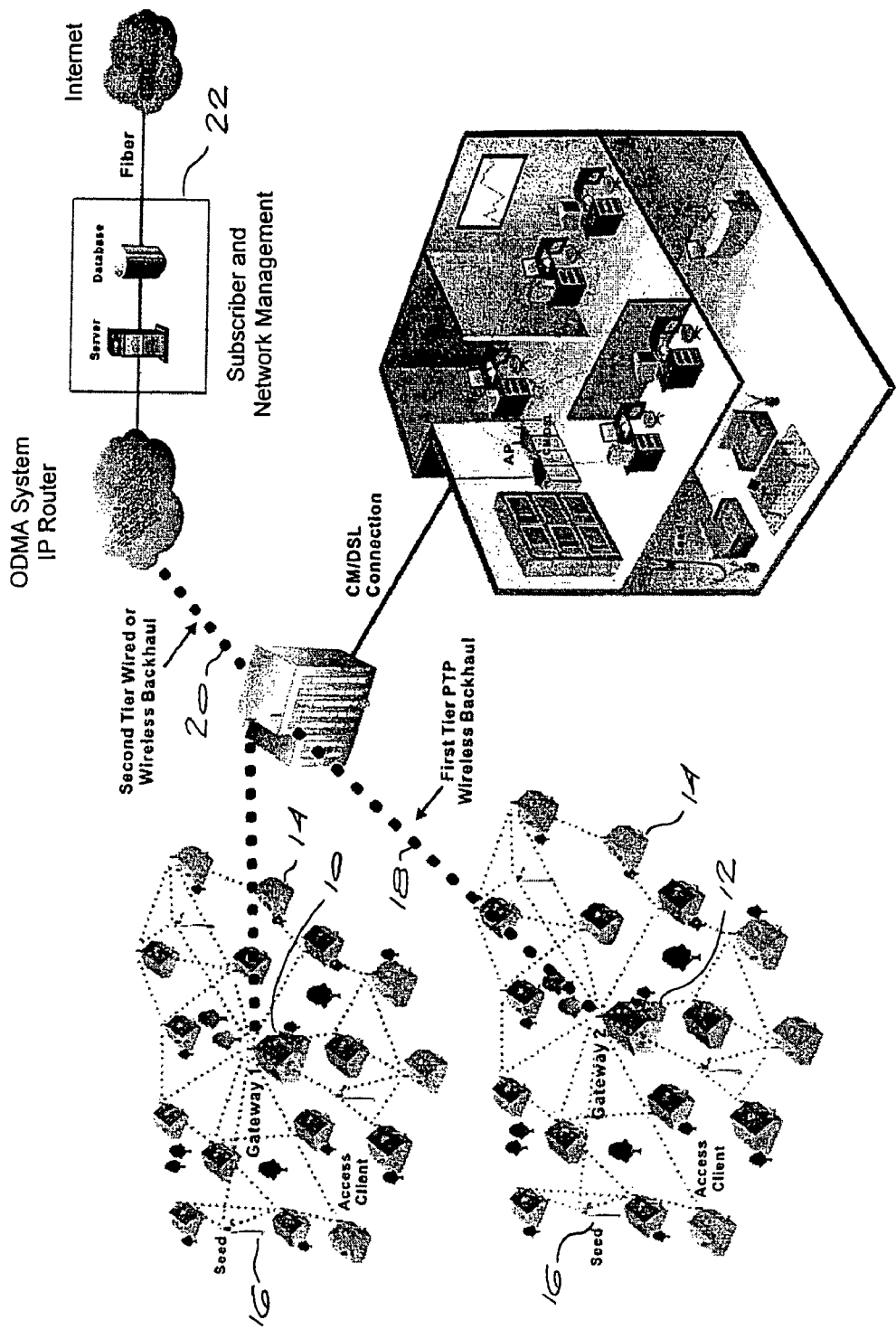
FIG. 1 is an overall system diagram showing a WLAN network utilising the method and system of the present invention.

In FIG. 1, first and second gateways 10 and 12 each serve as an access point to the network for a number of subscriber units (client devices) 14, who are typically network users. The client devices in this embodiment will typically be wireless network cards which can communicate with the respective gateways 10 and 12 either directly, or indirectly via other client devices, using ODMA techniques. In addition, a number of seed stations 16, which are wireless routers, are deployed strategically near the gateways 10 and 12. The seed stations effectively extend the coverage range and throughput of the network by extending the connectivity range of the client devices, particularly in difficult environments.

ODMA protocols can operate over wireless links to opportunistically relay data between subscriber units (client devices) and seeds, over wired networks such as local area networks, and the wireless backhaul or fibre links 18 and 20 shown in FIG. 1. The relaying from station to station may involve wire and wireless hops and hops via wireless backhaul as shown.

The network opportunistically routes messages wirelessly from subscriber to subscriber and via seeds into gateways and then via point to point links into fibre, into another region.

In this way a national and international network using ODMA, via the various types of network, can allow messages to be passed from any user to any other user in any part of the world. The network will automatically find optimal paths for the message packets to follow and provide load balancing and healing of broken links by finding alternate paths through the network. All units in the ODMA network have unique addresses called SID (System ID).

A subscriber network manager 22 monitors the health of the various stations in the network and manages the security and billing of the network.

In the above described example, the client devices can communicate with the gateways 10 and 12, either directly, via the seed stations 16, or via one or more intermediate client devices, in the manner described in the abovementioned International patent applications. In addition, the client devices can form instant, peer-to-peer networks with other similar devices.

The use of opportunistic multi-hop routing in a network of this kind improves network robustness, as client devices can hop to alternate gateways if their current gateway fails, and tends to eliminate bottlenecks and improve overall network performance. In conventional 802.11b systems, the range tends to be reduced drastically, typically to less than a hundred meters. In order to increase coverage to distant client devices the data rate must be reduced. In turn, the use of a low data rate causes client devices to stay on the data channel for longer, so that throughput suffers for all client devices of the WLAN. The use of opportunistic multi-hop routing solves this problem, since even distant client devices can, using multiple hops at the highest data rate through seed stations and neighboring client devices, transmit data to a destination, avoiding network congestion. The optimal use of channels and power adaptation reduces contention and optimizes the throughput offered to the users.

Figure 2:
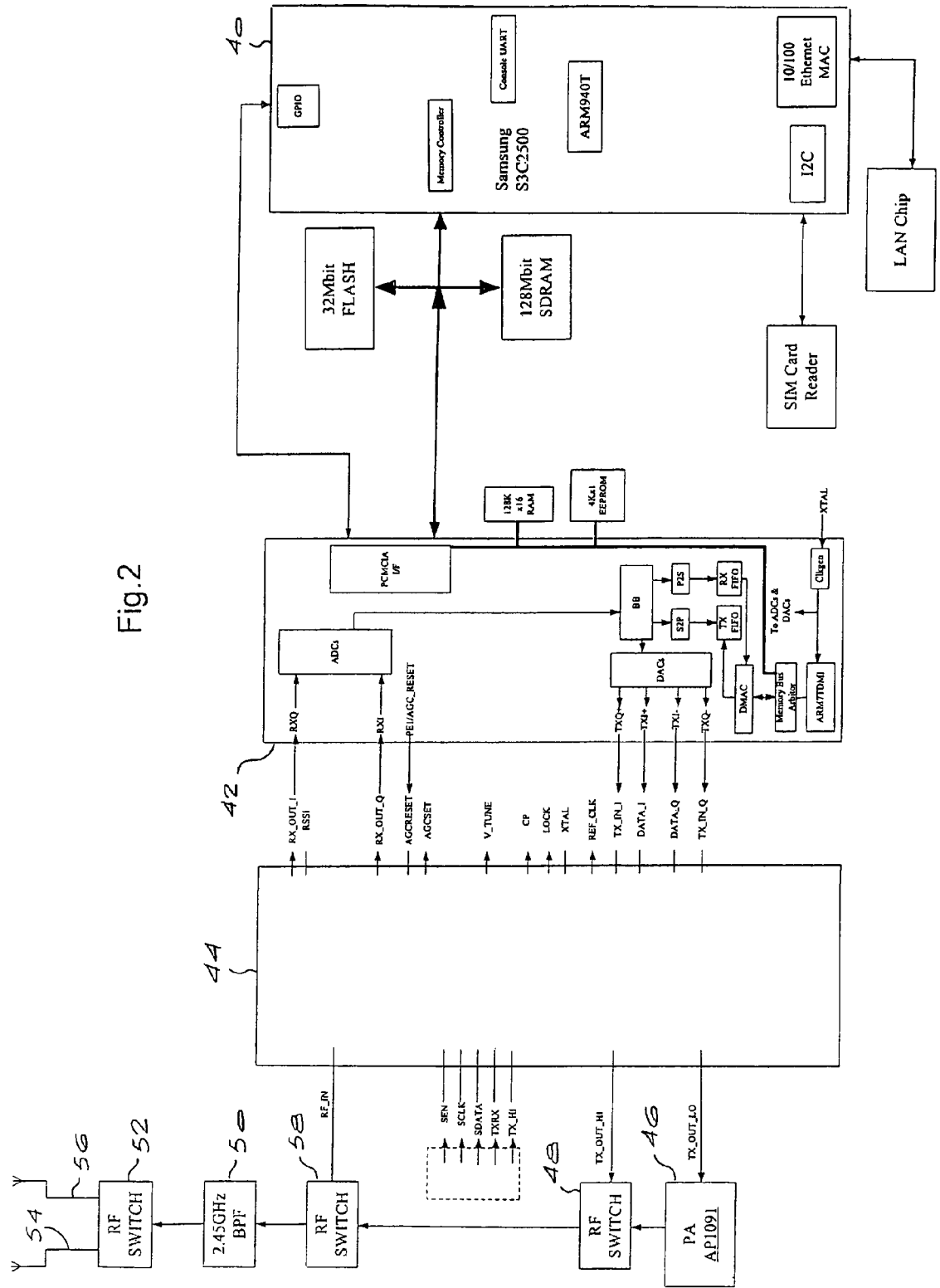
FIG. 2 is a schematic block diagram of a client device used in the network of FIG. 1.

FIG. 2 shows a schematic block diagram of a client device forming part of an 802.11b WLAN. The client device includes a Samsung S3C2500 microcontroller 40 with ARM940T RISC embedded. It also provides 10/100 Mbps Ethernet Controllers, a Memory Controller, I2C and GPIOs to communicate with a LAN chip, a SIM card reader and a ZD1201 Base-Band Processor. The S3C2500 chip is equipped with 32 Mbit Flash and 128 Mbit SDRAM memory.

The device includes a highly-integrated ZD1201 WLAN combination chip 42 which uses high speed DSP hardware logic to perform 802.11 and 802.11b baseband modulation and demodulation. To follow up the future MAC standards defined by IEEE 802.11 group, an ARM7 RISC processor is embedded in the ZD1201 chip. This permits use of the latest WLAN features by simply upgrading the software drivers.

The client device includes a SA2400 fully integrated single IC RF transceiver 44 designed for 2.45 GHz wireless LAN (WLAN) applications. It is a direct conversion radio architecture that is fabricated on an advanced 30 GHz fT BiCMOS process. The SA2400A combines a receiver, transmitter and LO generation into a single IC. The receiver consists of a low-noise amplifier, down-conversion mixers, fully integrated channel filters, and an Automatic Gain Control (AGC) with an on-chip closed loop. The transmitter contains power ramping, filters, up-conversion, and pre-drivers. The LO generation is formed by an entirely on-chip VCO and a fractional-N synthesizer. Typical system performance parameters for the receiver are 93 dB gain, 7.5 dB noise figure, input-referred third-order intercept point (IIP3) of +1 dBm, AGC settling time of 8 ms, and TX-to-Rx switching time of 3 ms. The transmitter typical system performance parameters are an output power range from −7 dBm to +8 dBm in 1 dB steps, −40 dBc carrier leakage after calibration, 22 dB sideband suppression, in-band common mode rejection of 30 dB, and Rx-to-Tx switching time of 3 ms.

The device comprises a power amplifier stage in the form of an AP1091 linear, two stage power amplifier 46 with high output power in the 2.4 GHz band. The device delivers 26 dBm of linear output power compliant with the IEEE802.11b standard. The power amplifier also includes an on-chip power detector, providing a DC voltage proportional to the output power of the device.

The device further includes a DC-3 GHz SPDTRF switch 48, which has low insertion loss and positive voltage operation with very low DC power consumption.

A first RF switch 52 close to the antennas 54 and 56 provides the ability to choose which antenna is used for transmission or reception. From the selected antenna, the received input is applied to a 2.45 GHz bandpass filter 50. This filter rejects interferers outside the 2.4 GHz ISM band. A second RF switch 58 close to the 2.45 GHz bandpass filter provides TX/RX switching. This switch in receive mode leads the signal into the LNA section of the SA2400. Next, the signal is mixed down to baseband with the quadrature downconverter into the I and Q components. Finally, the signal goes to the ADC's of the ZD1201. The baseband circuit samples the waveform and then despreads and demodulates the received data.

On the transmit link, data can be DBPSK, DQPSK or CCK modulated, resulting in a baseband quadrature signal with I and Q components. The signals then go to the input of the upconverting mixer for conversion to the 2.4 GHz-2.5 GHz band. The SA2400 is operated in either high-power mode or low-power mode to cover a high output power range. When operated in high-power mode, the TX_OUT_LO is selected and goes to the AP1091 amplifier to provide high output power. When operated in low-power mode, the TX_OUT_HI is selected and the signal goes through the RF switch directly. Note that a TX AGC function is provided by the ZD1201 Base-Band Processor 42.

Figure 3:
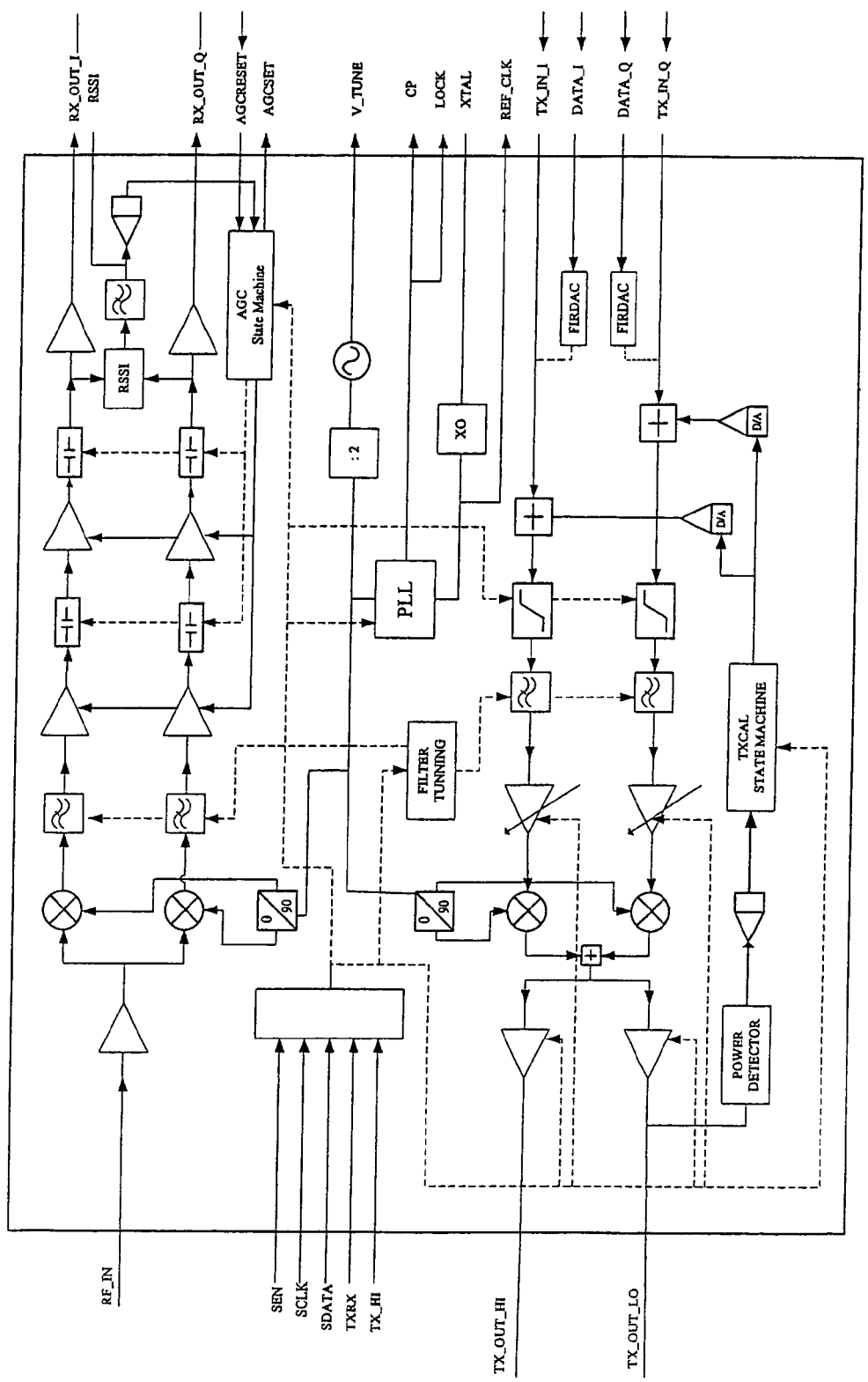
FIG. 3 is a detailed schematic diagram of a single chip transceiver used in the device of FIG. 2.

The internal circuit of the SA 2400 transceiver is shown in the more detailed schematic diagram of FIG. 3.

Figure 4:
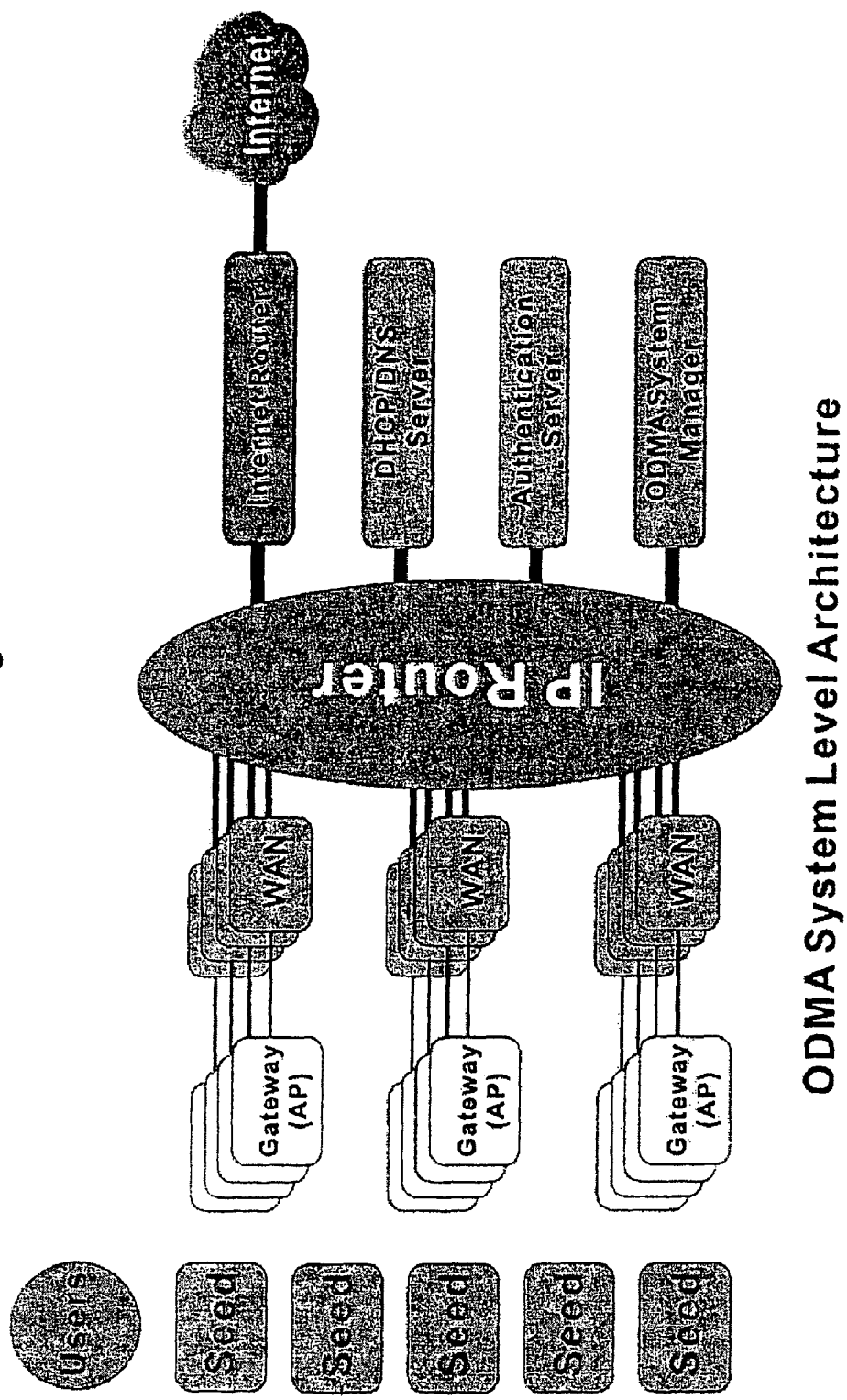
FIG. 4 is a schematic diagram of the system level architecture of the network of FIG. 1.

FIG. 4 shows the system level architecture of the network of FIG. 1. The system essentially comprises subscriber units or users (client devices), seed stations, and gateways that link the client devices to a WAN. The client devices can communicate with each other by relaying messages directly between themselves or via the seed stations. If a user wants to access other networks such as the Internet the messages are relayed to the WAN via a gateway and then a router network into the other networks. The gateways act as translators from the ODMA protocols used by the client devices and seed stations to other protocols such as TCP/IP.

The operation of the above described network will now be described with reference to the schematic diagrams of FIGS. 5 to 9.

Figure 5:
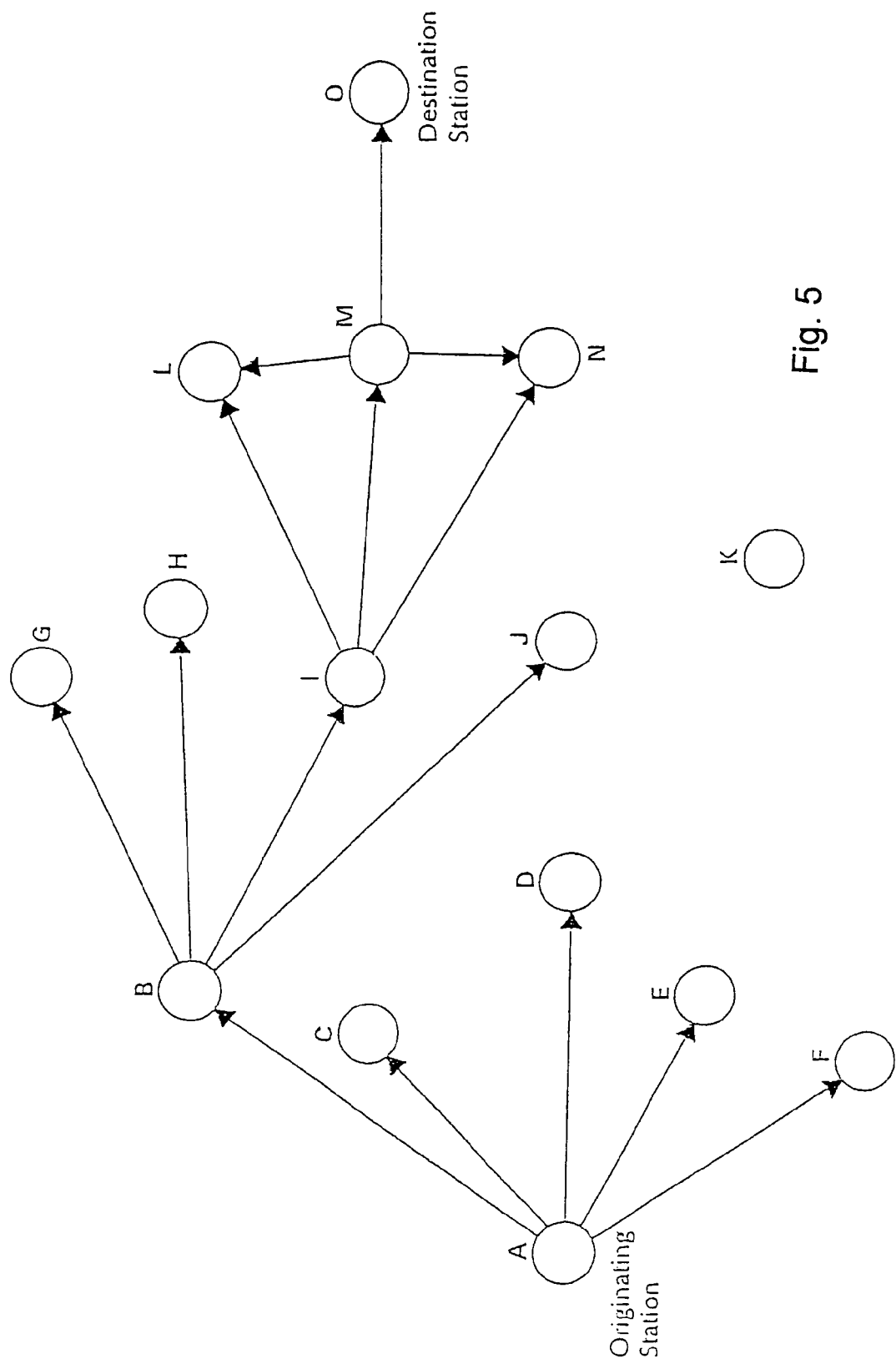
FIG. 5 is a schematic diagram of a network of the invention, in which stations communicate with one another via intermediate stations.

In FIG. 5, an originating station A is able to communicate with five "nearby" stations B to F, and is transmitting data to a destination station O via intermediate stations B, I and M. The stations A to M and O will generally be user stations comprising client devices as described above, but some may be seed stations, for example.

In order to maximize the efficiency of the network, it is desirable that each station should have a number of "neighbor" stations with which it can communicate, in case that station needs to send or receive a message. On the other hand, if a given station is transmitting data to a selected neighbor station, it is desirable that the transmission should cause the minimum of interference to other stations, otherwise the resulting contention between stations will reduce the amount of data throughput in the network.

With the above in mind, the present network seeks to adjust the operation of each station so that it can at any time send data to or receive data from a number of neighbor stations, at the highest possible data rate but at the lowest possible transmitted power, thus reducing interference with other stations.

A communication network of the kind in question comprises many stations trying to communicate on the same set of channels. The channels can be defined as having different frequencies, different media, different coding (eg. different spreading codes), different antennas, different time slots etc., or any combination of these. In order to optimize channel re-use, the stations try to maintain a limited number of immediate neighbors, typically 5 neighbors. A neighbor is defined as another station that a given station can communicate with.

A station can limit the number of neighbors it sees or that see it by changing its transmission frequency, changing code (PN Sequence), increasing its data rate, and dropping its transmit power. All stations will gather at predefined Probing Channels where they will find other stations to communicate with, using probe signals. Once another station is found and either of the stations have data to send to the other they may then move to a less used Data Channel.

The method of the present invention comprises two kinds of probing processes, "slow probing" and "fast probing". The slow probing process is used by each network station to gather neighbors, while the fast probing process is used to construct gradients between originating and destination stations.

Dealing first with the slow probing process, when there are a number of stations in close proximity they will end up probing at higher data rates and low transmit powers. Stations will occasionally respond to stations that are on probing at the lower data rates or that do not have enough neighbors to help any lonely (distant) stations (also referred to below as lonely neighbors) that cannot use the higher data rates or do not have sufficient neighbors. Stations will only use the lower data rates when they are lonely and cannot find sufficient neighbors at the higher data rates and at maximum power.

Each station will transmit slow probe signals at regular intervals (determined by a Slow Probe Timer) trying to find other stations. Stations indicate in their slow probes that they are able to detect other stations probing and in that way stations will vary their probe power until a certain predetermined number of stations indicate they are able to detect the probes. If a station never acquires the required number of neighbors it will remain at the lowest data rate and maximum transmit power.

Each station will randomly vary the Slow Probe Timer slightly between slow probe signal transmissions to avoid collision with other stations. Should any station start receiving another station's transmission, it will reload the Slow Probe Timer with a new interval.

In a network of mobile stations the stations are constantly moving, and as such the number of neighbors will constantly be changing. If the number of neighbors exceeds the required number a station will start to increase its data rate on the probing channel. It will continue to increase its data rate until it no longer exceeds the required number of neighbors. If it reaches the maximum data rate it will start to drop its slow probe transmit power by 10 dB increments until it either reaches the minimum transmit power, or no longer exceeds the required number of neighbors.

When a station replies to another station's slow probe on a Probing Channel it will limit the length of its data packet to the Slow Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Probing Channel. The station that is requesting the change will randomly select one of the available Data Channels.

(When the other station receives the request it will immediately change to that Data Channel, where the two stations will continue to communicate until neither of them have any data to send, or if the maximum time for remaining on the Data Channel expires (set by a Data Timer). Alternative data transport protocols could also be used.

Figure 6:
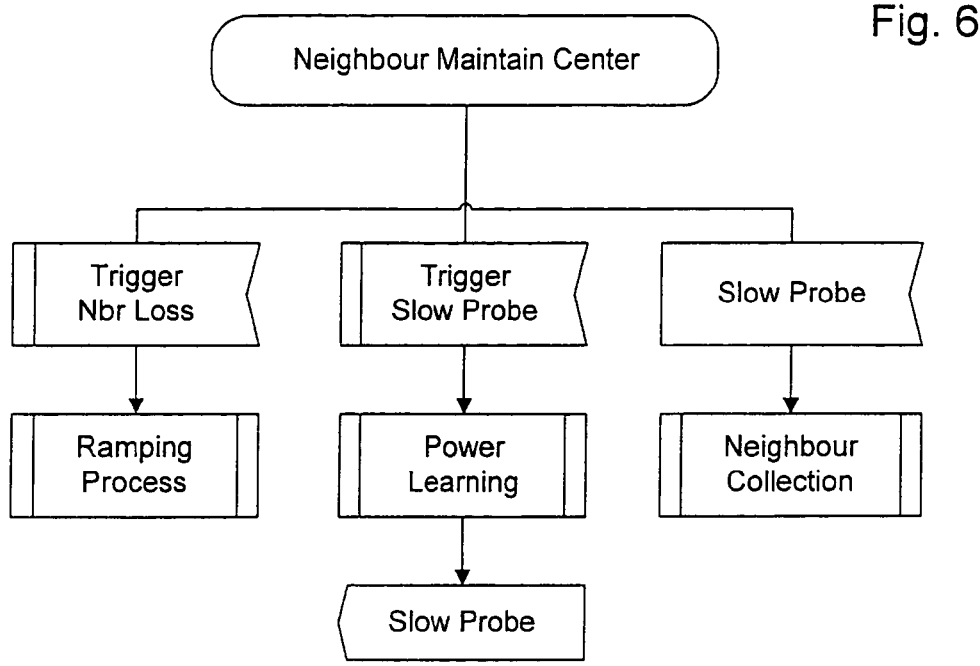
FIG. 6 is a simplified schematic diagram illustrating a slow probing method used by the network to gather neighbors.
Figure 7:
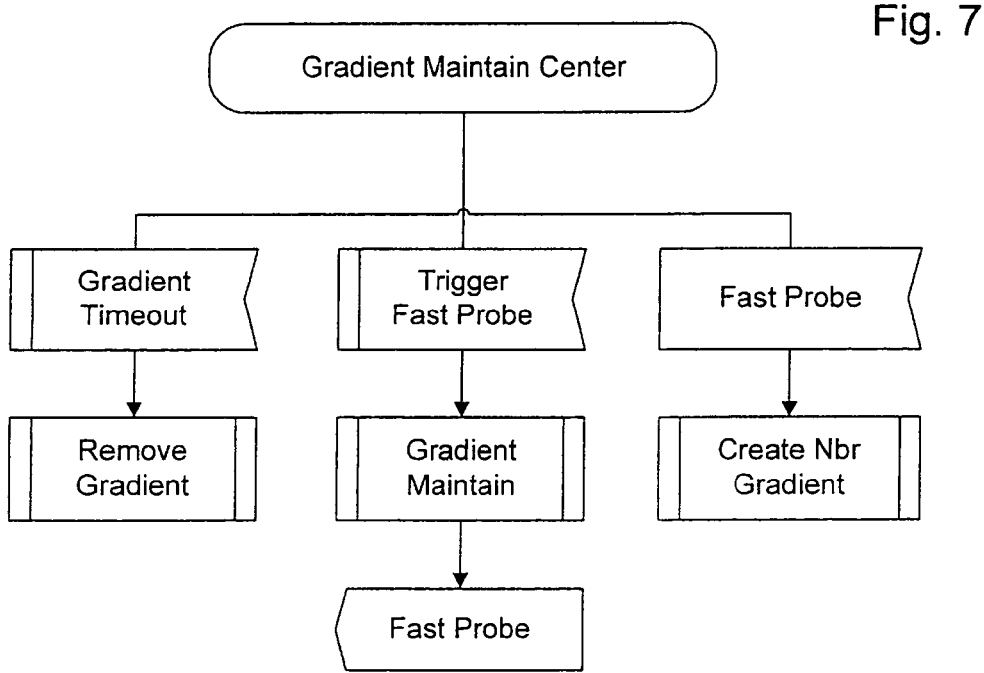
FIG. 7 is a simplified schematic diagram illustrating a fast probing method used by the network to maintain cost gradients between stations.

When a station changes to the Data Channel it loads the Data Timer. It will remain on the Data Channel for as long as the Data Timer will allow. When the Data Timer expires the stations will revert back to the Probing Channel and start probing again. The schematic diagram of FIG. 6 illustrates the slow probing process of the invention.

The slow probing process consists of three basic functions:
1. Neighbor collection
2. Power learning
3. Ramping of neighbors The process of neighbor collection consists of a station probing at increased levels of power until neighboring stations indicate in their own probes that they are detecting the probes of the first station. This is called neighbor collection. The power of the probe is increased until a predetermined number of neighbors indicate that they are detecting the probes.

All probing stations increase and decrease their probe power until all stations have collected a predetermined number of neighbors. This process consists of increasing and decreasing the power level of probes and indicating in probes which other stations' probes are heard. In this way all stations can learn what power level they require to reach various neighbors. Each time a station probes it indicates its transmit power and noise floor and which stations it has as neighbors. Every time a station hears another station probe it calculates from the probe the path loss and power required to reach the station from the path loss and the noise floor of that station. The path loss to the neighbor and the power required to reach the neighbor is stored in a table kept at each station called a neighbor table. If a neighbor is no longer heard then the path loss and power level required to reach the station is increased or "ramped" in the table until a certain level is reached at which point the neighbor is removed from the neighbor table.

The slow probing process of the invention is described in more detail in the following example:

Slow Probing Parameters
Min Probing Power (PPmin)
Max Probing Power (PPmax)
Probing Power step (PPstep)
Probing Interval (Pint)
Probing Interval std dev. (Psdev)
Probing Intervals per power step (nPPs)
Neighbor Timeout interval (TNint)
Close Neighbor Timeout interval (TCNint) (TCNint<TNint)
# of close neighbors to gather (nNbrs)
Max # of neighbors to include in a probe (nPNbrs)
Station noise floor (Nfloor)
Loss ramping time (tinc)
Loss ramp increment (Linc) (dB)
Loss ramp excess (Lex) (dB)
Types of Message
Probe
Probe Ack
Definitions
Neighbor: a station that has transmitted a Probe or Probe Ack that can be seen at this station.
Close Neighbor: a Neighbor that has transmitted a Probe that contains this station's ID.

Protocol (for Each Station):

At regular intervals (Pint+/−Psdev) each station sends out a Probe. Initially transmit at power PPmin. At each nPPs intervals increase power by PPstep until at least nNbrs Close Neighbors have been found (they have responded with this station's ID in their Probe messages) or the power reaches PPmax (at which stage continue Probe transmissions at this power level). If more than nNbrs Close Neighbors can be seen, start ramping the power back down.

A Probe consists of the following information:
a. The noise floor at this station (Nfloor).
b. The transmit power of this probe message.
c. The total number of Neighbors of this station (not used at present).
d. The total number of Close Neighbors of this station.
e. The station IDs of the nearest nPNbrs (or fewer) Neighbors (or possibly all Neighbors—an option).

(The nearness of a Neighbor is based on the received power of that Neighbor's last Probe message)

When not probing, the station is listening for Probes (or Probe Acks) from other stations. When another station's Probe is heard, the transmit power info in the Probe message is used to determine the path loss to that station. The noise floor information is then used to determine the minimum transmit power needed to send a message to that station and the Neighbor table updated suitably.

If a station is heard that:
(a) is transmitting its Probe at PPmax power,
(b) claims to have fewer than nNbrs Close Neighbors,
(c) is not one of the Close Neighbors of this station and
(d) that this station can communicate with,
then the remote station is considered a "Lonely Neighbor". In this case immediately (+/−Psdev) send a Probe Ack message at a suitable power that it can be heard by the remote station. The Probe Ack contains the following information:
a. The noise floor at this station
b. The Tx power of this Probe Ack message
c. The station ID of the "Lonely Neighbor"

If this station hears a Probe Ack message containing this station's ID, then the transmitting station is tagged as a Close Neighbor.

If a neighbor table entry is not updated (by probes from that neighbor) after time tinc, add Linc to the reported loss in the entry. Repeat this at intervals of tinc until either the entry is updated by a probe, or until the transmit power required to reach the neighbor using the reported loss exceeds the maximum permitted power by Lex dB. In the latter case set the loss to infinity. Note that changes here may well cause existing gradients to freeze.

If the loss is at infinity and no entries exist in the gradient table involving the neighbor, then the neighbor table entry should be deleted.

If a Probe/Probe Ack is not heard from a Neighbor for TNint then drop the Neighbor. If a Probe/Probe Ack is not heard from a Close Neighbor for TCNint then revert the Close Neighbor back to Neighbor status.

The cost to a particular neighbor can be calculated in terms of the transmit power to reach the neighbor.
For example less than −10 dBm=cost 1
Less than 0 dBm=Cost 2
Less than 10 dBm=Cost 3
Less than 17 dBm=Cost 4

The cost is an indication of the power required to reach a neighbor. The more power required the more interference, and the higher the cost in terms of power (battery) consumption etc.

If all the costs for multiple hops are added together then the total cost is an indication of how much power would be used, or interference generated, if a message followed those hops.

The slow probe develops an indication of the power required to reach neighbors.

If a station has a message for a destination that is not one of its neighbors, for example, a distant station across the network, it begins to transmit fast probe signals to develop information on how to reach the destination. The information is called a gradient and is an indication of the cumulative cost to reach a destination. When a station starts to fast probe it indicates that it is looking for a destination and neighbors hearing the fast probe will fast probe themselves until the destination hears the fast probes of its neighbors. The gradient is then built through adding cumulative cost until the gradient reaches the source, and the source can commence to send messages to neighbors that have lower gradients to destination, which in turn can send them to their neighbors until the destination is reached. The fast probe process is illustrated concisely in FIG. 7.

Each station keeps a record of the (cumulative cost) gradients to each destination of each of its neighbors, and its own gradient to the destination. Each station only passes messages to stations with a lower cumulative cost to destination. A station can pass a message to any of its neighbors with a lower gradient to destination. Neighbor gathering via slow probing and gradient generation via fast probing allow a station to develop a number of choices of stations with lower cost to any destination that can send messages to such destinations. The neighbors are maintained all the time via slow probing and gradients are only developed on a needs basis when messages need to be sent to stations that are not neighbors.

The method of the invention contemplates three different data transport algorithms, with much commonality between them:
1. A Comprehensive algorithm. This algorithm offers the most potential throughput, the most robustness and the best use of resources.
2. An Abbreviated algorithm. This algorithm is a subset of the comprehensive algorithm. It offers a similar robustness, but does not make maximal use of the network resources. It is, however, simpler, has less overhead on the probing channel, and works without the need for broadcast transmissions.
3. A Slow Switching algorithm. This is similar to the Abbreviated algorithm in that it assumes no broadcast-type transmissions, but reduces the number of messages and channel switches when a small number of packets (small amount of data) is to be transmitted, and is thus more useful in systems where switching channels and/or switching from receive to transmit (or vice versa) takes a significant amount of time. This algorithm also has advantages if the controlling processor cannot rapidly process incoming requests. It assumes a multi-channel environment (i.e. one probing channel and one or more data channels)

Comprehensive Algorithm

Messages are broken into packets at the originating (source) station. A station with a packet to send broadcasts a Request to Send message (RTS). Neighboring stations that are not busy and are closer (gradient-wise) to the destination transmit back a Clear to Send message (CTS), and a Ready to Receive message (RTR) for multi-channel systems. The data packet is transmitted to one of those stations. When it is received, the receiving station transmits a Packet Acknowledge message (ACK) back to the transmitting station. At the destination station, all packets are collected and re-assembled into the message. Once the entire message has been received, an End-to-End Acknowledge message (End-to-End ACK) is transmitted back to the message originating station.

Various mechanisms are also used to counter pathological cases (e.g. message collisions, missing packets, timeouts, etc.). All non-Data messages (RTS, CTS) are transmitted on the selected probing channel. Other Data packets, RTR and the data ACK are transmitted on other available "data" channels (if more than one channel is to be used). All transmissions in the comprehensive algorithm are effectively "broadcast" messages. i.e. any listening station can hear them and understand their content.

Figure 8:
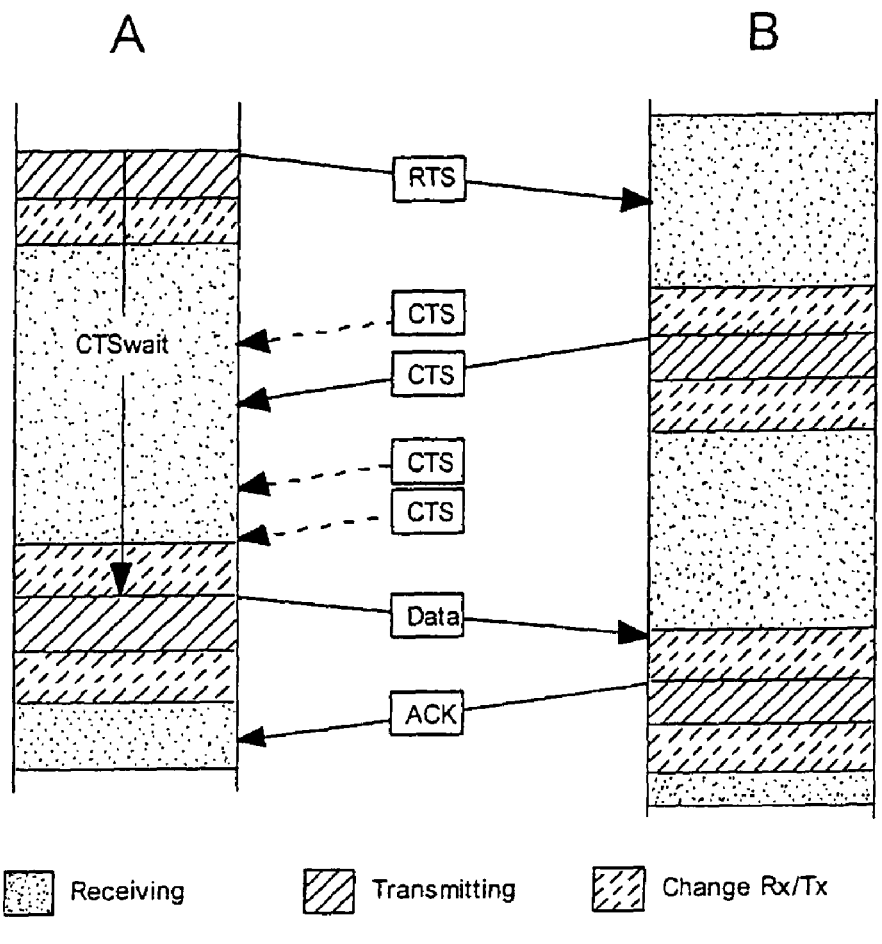
FIGS. 8 and 9 are schematic diagrams illustrating data flow in single and multi-channel applications, respectively, according to the data transport protocol of the invention.
Figure 9:
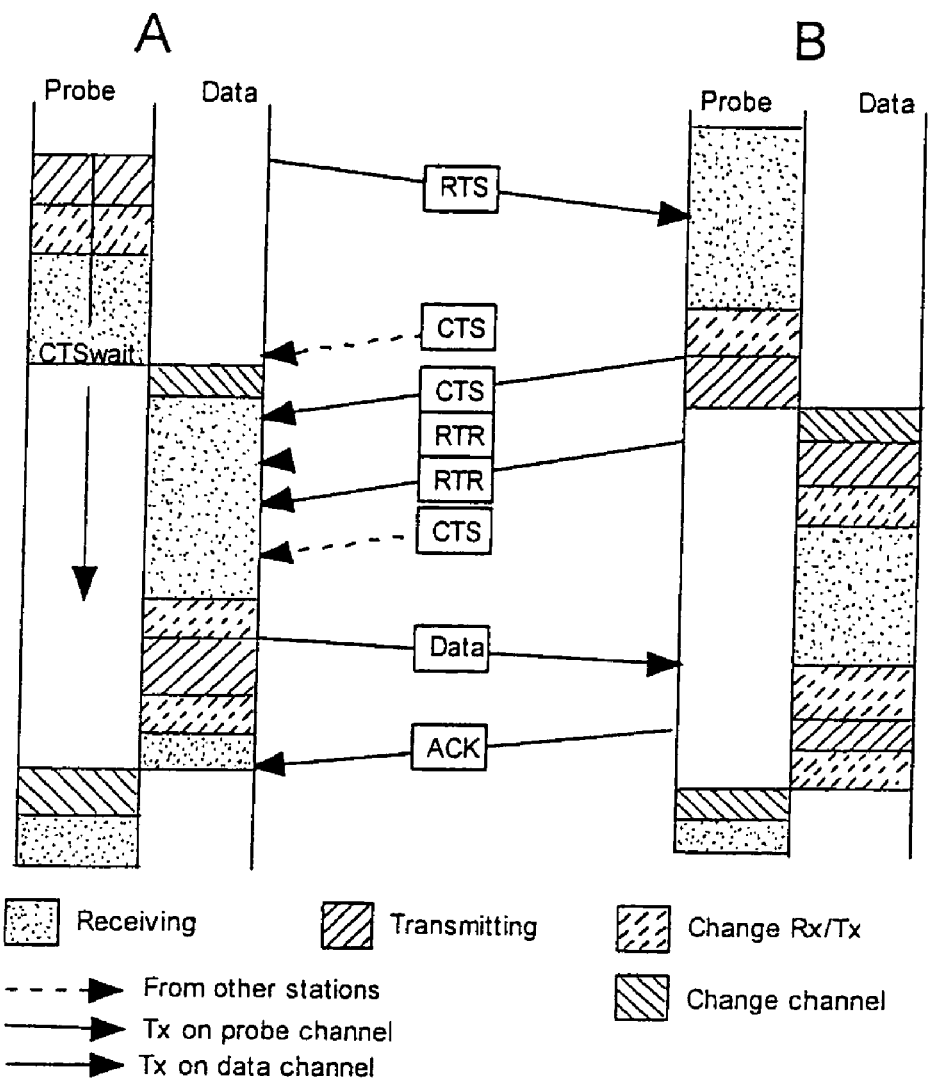

FIGS. 8 and 9 illustrate graphically the data flow process, for single channel and multi-channel cases, of the comprehensive algorithm.

Abbreviated Algorithm

Messages are broken into packets at the source station. A station with a packet to send transmits an RTS to the neighbor with the best gradient to the destination (that gradient being chosen via the Cost Function ID of the message). If that targeted neighbor hears the RTS, is not busy and is closer (gradient-wise) to the destination, then it transmits back a CTS (and an RTR for multi-channel systems). The data packet is transmitted to that station. When it is received, the receiving station transmits an ACK back to the transmitting station. At the destination, all packets are collected and re-assembled into the message. Once the entire message has been received, an End-to-End ACK message is generated back to the message source station. Various mechanisms are also used to counter pathological cases (e.g. message collisions, missing packets, timeouts, etc.).

All non-Data messages (RTS, CTS) are transmitted on the probing channel. Other Data packets, RTR and the data ACK are transmitted on other available "data" channels (if more than one channel is to be used). All transmissions in the abbreviated algorithm are directed at a target station. All other listening stations should ignore any messages not targeted at themselves.

Slow Switching Algorithm

If the amount of data to be transmitted from station A is Pmax packets or fewer then each packet is transmitted individually on the probing channel. A suitable neighbor station B is selected from A's gradient table and the first packet is sent to B via a targeted DATA transmission after a small random delay. If B receives the data and accepts it, it transmits an ACK back to A. A then continues with the second packet. If A does not receive an ACK from B, another target neighbor is selected (on a round-robin basis) and the process repeated.

If the amount of data to be transmitted from station A is more than Pmax packets then the data is transmitted to a suitable neighbor station B, chosen from the gradient table at A. An RTS is targeted at B with a suitable data channel selected. When B receives the RTS it switches to the data channel (if necessary) and awaits transmissions from A. A switches to the data channel, sends the first packet as a DATA transmission and awaits an ACK from B. Upon receiving the ACK, it sends the second packet if applicable and B responds with ACK. This continues until all packets have been sent at which stage both stations revert to the probe channel if applicable. Packets may be combined into single transmissions if necessary. If no ACK is received, A reverts to the probing channel, chooses another neighbor (round-robin) and proceeds as before.

For brevity, only the comprehensive algorithm is discussed in detail below.

A message or block of data must be broken into smaller blocks of length not exceeding Psize. Each packet is numbered from 1 to Nmsg, where Nmsg is the number of packets required. Typically the last packet (numbered Nmsg) will be smaller than Psize. These packets are added to the message queue at the originating station. Associated with each packet are six items: (1) the originating station ID, (2) the destination station ID, (3) a message ID, unique to the originating station, (4) the packet number (between 1 and Nmsg), (5) Nmsg and (6) Time to live (initialized to TTL).

It should be noted that packet generation at a station starts the process of fast probing (if not already in progress). An End-to-End ACK message received at the source station typically causes the gradients to be dropped.

The source station retains all packets of a message in the message queue until it receives an End-to-End ACK from the destination with that message's ID. The destination station retains all packets of a message in the message queue until all Nmsg packets have arrived, the message has been delivered, and an End-to-End ACK has been sent.

A station that is neither source nor destination of a message packet will retain the packet in the message queue until it has been transmitted to another station and an ACK has been received from that station.

A message is delivered at the destination when all packets of that message have been received at the destination and an End-to-End ACK message has been generated.

A station that has one or more data packets waiting for transmission chooses the packet with the shortest time-to-live and broadcasts a Request to Send (RTS) message with information pertaining to that message and a randomly-selected data channel (selected from those data channels (if any) that are not listed in the Blackout period list as being Transmit blackouts, and which do not have excessive noise. If the only available channels all have excessive noise, choose the one with the least noise). While any packet in the queue has the status "Awaiting ACK" or Awaiting "CTS" or no data channels are available (all blacked out), do not transmit an RTS. If no data channels are available, use the Transmit blackout entries to determine a suitable time to transmit the RTS. Make sure that the intended data transmission does not occur during this station's "off channel" time, if applicable. The actual transmission time for a packet is dependent on the data rate used. If multiple data rates are being used then the time reservation should be based on the lowest such data rate. The transmission is made with sufficient power to reach all Close neighbors, using the probing channel.

Transmission takes place when a packet exists in the message queue and none has the status "Awaiting ACK" or "Awaiting CTS". Once transmitted, do not send another RTS until the CTSwait period is complete. Mark the packet in the message queue with the status "Awaiting CTS". If no CTS messages were received corresponding to the RTS during this period, transmit the RTS again.

In a multi-channel system, immediately after transmitting the RTS, the station should start listening for CTS messages on the probing channel.

If the RTS is a retransmission (i.e. no RTR was received during the CTSwait period (or no CTS was received for the single-channel case)) then wait for a period of time before retransmitting the RTS in order to avoid collisions with other stations doing the same. The period should be random and should have a duration of between 1 and 10 RTS typical transmission durations. e.g. if a typical RTS transmission takes 0.1 msec, then delay between 0.1 and 1 msec.

In response, the station can expect RTR messages on the data channel from neighbors that heard the RTS and are willing to accept the associated data packet. In a single-channel system then expect CTS messages instead. If no CTS messages (and/or RTR messages) are received during the CTSwait period, resend the RTS.

A station transmits a Clear To Send (CTS) message in reply to an RTS message if the station is willing to accept data. On multi-channel systems this is transmitted on the probing channel to inform non-participating stations of the intended data transmission so that they can avoid interfering with that transmission. In multi-channel systems the first CTS transmitted also tells the receiving station to switch to the data channel (to await RTR messages).

The CTS message is transmitted with sufficient power to reach the station that transmitted the RTS, using the probing channel. If this is a multi-channel system then immediately after transmission of the CTS, the station should switch to the required data channel and transmit a corresponding RTR. Transmission of the CTS occurs upon reception of an RTS from another station A, but only if (a) the cost to destination is lower than the cost to destination from A and
(b) the time-to-live of all packets (if any) in the message queue is strictly larger than the time-to-live of the request from A and
(c) the Data transmit time/duration/channel will not coincide with any Receive blackout periods in the Blackout period list and
(d) transmitting the CTS during the CTSwait period will not interfere with any known data transmissions (Transmit) in the Blackout period list (i.e. the transmit power would not cause interference at any of the target stations in the Blackout period list) and
(e) the station is prepared to receive one or more packets from the sending station (the maximum being the number of packets that can be transmitted at the highest data rate in the time to send one packet at the lowest data rate).

Note: (d) is only applicable if one channel is being used for both probing and data.

The CTS is timed to transmit at a random time during the CTSwait period.

In response to its CTS message, a station may receive nothing (if the station transmitting the RTS chooses another station as its target) or a data transmission. However, the station does not know in advance whether it will be the selected station. Either way, the station must start listening on the specified data channel at the time the data is expected to transmit. If at that time it hears nothing, a garbled message, or a message header for a non-expected message, then the station can immediately switch back to the probing channel. It must make sure that no other transmissions are made from this station during this period.

For multi-channel systems, immediately after transmitting the CTS, the station switches to the chosen data channel, transmits a corresponding RTR and remains listening on that channel as above.

A Ready to Receive (RTR) message is only used in multi-channel systems. This is transmitted on the data channel in order to announce to the sending station that this station is willing to accept data (similar to CTS in single-channel systems), and to allow the sending station to compute path loss and noise on this data channel, etc. It is sent after sending the corresponding CTS separated by enough time for the receiving station to switch from the probing channel to the data channel if necessary.

When the station sends an RTR (at the same data rate as the probing channel) it must have measured the noise on the data channel, and the station that transmits the data makes an assumption that the sensitivity will be defined by the noise plus different offsets depending on data rates. The station receiving the RTR will have an accurate measure of path loss and be able to calculate the transmit power required to send the data at different data rates.

Multiple stations send RTR messages and these can be sent at slightly higher power to allow for the uncertainty of the path loss difference between the probing channel and the data channel. The RTR messages are short and robust and have a much higher probability of success than the data message. The data message is sent and exact path loss and noise information is available. The station receiving the RTR can decide what data rate and packet length to best use the time it has reserved.

The RTR message is transmitted with sufficient power to reach the station that transmitted the RTS, using the data channel. The noise floor included in the RTS transmission is used, and the same path loss to the RTS transmitting station as the probing channel is assumed. The power is increased slightly to compensate for any possible differences.

Immediately after transmitting the CTS on the probing channel, switch to the selected data channel and transmit the RTR.

In response to the RTR the station may receive nothing (if the station transmitting the RTS chooses another station as its target) or a data transmission. However, the station does not know in advance whether it will be the selected station. Either way, the station must continue listening on the specified data channel until the time the data is expected to transmit has passed. If at that time it hears nothing, a garbled message, or a message header for a non-expected message, then the station can immediately switch back to the probing channel.

The following description relates to Data Packet Transmission.

A packet of data is transmitted to a neighbor for subsequent transport to the destination. Since the time reservation for the Data message is based on the lowest available data rate, then if a higher data rate is used it might be possible to send two or more packets from the same message (or from a message whose packets have an equal or longer time-to-live and have the same destination) at the higher rate such that the total transmission time is less than or equal to that reserved previously.

Note: if multiple packets are sent in one transmission, additional data uniquely identifying each of the packets must be included in the Data message so that the receiving station can disassemble them.

Data is transmitted with sufficient power to reach the station determined to be the target from previous CTS receptions, using the specified data channel.

Single Channel Case: During the period until CTSwait after the RTS was transmitted, listen for CTS messages on the probing channel. Once the CTSwait period is over, randomly choose one of the CTSing stations (or pick the station with the lowest reported cost to destination), and send the data to that station on the chosen data channel.

Multi-Channel Case: During the period until CTSwait after the RTS was transmitted, listen for RTR messages on the data channel. Once the CTSwait period is over, randomly choose one of the RTRing stations (or pick the station with the lowest reported cost to destination), and send the data to that station on the data channel.

A Packet Acknowledge (ACK) message from the targeted station on the chosen data channel can be expected in reply, which reports successful reception of a data packet to the sender of that packet. It is transmitted with sufficient power to reach the station that sent the data packet, using the same data channel the data packet was transmitted on. If this is a multi-channel system then noise and path loss information from the corresponding data message transmission is used to compute the required transmit power.

When a data packet arrives (that is not an ETE ACK or ETE NAK packet) at its destination, a check is done to see whether all other packets of that message have previously arrived. If so, a special End-to-End Acknowledgement (ETE ACK) message (a single packet) is generated containing the message ID and targeted at the message source station. This is a special message generated at the destination to tell the source that all packets of a message were received and delivered. It is placed in the message queue and treated like any other message packet.

If the packets of a message residing at the destination of that message have a time-to-live that falls below TTL-Tnak, then an End-to-End Non-Acknowledgement (ETE NAK) message is generated targeted at the message's source station and containing a list of the missing packet/s. It is placed in the message queue and treated like any other message packet. Thus, this message is generated at a message destination to request the source to retransmit one or more packets of the message.

The following applies to any station receiving a message. If the receiving station
 (a) has no packets in its message queue with a time-to-live less than the time-to-live in the RTS message, and
 (b) has a cost to destination (CD (best cost to destination), or CDF if the gradient is frozen) less than that specified in the RTS message, and
 (c) transmitting a CTS during the CTSwait period after receiving the RTS will not interfere with any known Transmit entry in the Blackout period list, and
 (d) the Data transmission time/duration/channel does not coincide with any Receive entries in the Blackout period list, and
 (e) this station will not be "off channel" during the time/duration of the data transmission,
then: a CTS message back to the transmitting station is generated and transmitted.

Note: (c) is only applicable if a single channel is being used for probing and data. This station is marked as being "off channel" during the data transmission period.

If the station has already retained a copy of the data packet from a previous data transmission (the transmitting station presumably did not hear the ACK), then it should relay this fact in the CTS. Also, if any packets from the same message are cached in the Message queue or Retained data list, include those packet numbers.

In order to avoid RTS "race" conditions,
 (a) If the receiving station already has an outgoing RTS scheduled for transmission, but has not yet transmitted it (i.e. it can be cancelled if necessary), and the incoming RTS has a higher priority (the data has a lower time-to-live), then reschedule the outgoing RTS for a later time and reply as usual to the incoming RTS with a CTS.
 (b) If an outgoing RTS has already been transmitted and the incoming RTS has a higher priority (the data has a lower time-to-live), then ignore incoming CTS messages for the transmitted RTS and reply as usual to the incoming RTS with a CTS/RTR. Reschedule the original RTS for later transmission.

In either of the above cases, if the time-to-live for both incoming and outgoing RTS messages are the same, use the random number in the RTS messages to decide which message has higher priority and then decide whether or not to ignore the incoming RTS.

If a second RTS is received between the time the first RTS is received and the corresponding CTS/RTR is transmitted, and the second RTS is of higher priority than the first (i.e. data has lower time-to-live), then cancel the scheduled CTS/RTR and service the second incoming RTS. If this is not the case, ignore the second RTS.

In response to a Clear to Send (CTS) message, the receiving station notes the information returned in the CTS (in response to its RTS). At the end of the CTSwait period it decides on a target station (lowest cost to destination or randomly) and sends the Data packet to the chosen station.

In a multi-channel system, the reception of the first CTS on the probing channel causes the station to switch to the data channel and listen for the corresponding RTR and any further RTRs from subsequent CTS/RTR replies from other neighbors.

Note that a station should not switch from the probing channel to the data channel until a CTS is received corresponding to the RTS. This implies that if no CTS messages are received then this station will not switch to the data channel, and will need to retransmit the RTS after the CTSwait period is complete. Also note that if, after the CTSwait period is complete, no RTRs were received, then immediately switch back to the probing channel. Note also that RTR would need to be delayed by a suitable amount of time after the corresponding CTS to allow the switch between probing channel and data channel.

In single channel systems only, if the transmitting station CTS message specifies that it already has a copy of the packet (or packets from the same message) from a previous transmission, then it will be notified to queue and transmit it/them via a "null" data transmission.

A non-targeted station should note the expected time of Data transmission and the length/channel of that transmission (adding the information as an Transmit entry to the Blackout period list) and avoid any transmissions during that period at a power level that would interfere with the station transmitting the CTS.

If the transmitting station CTS message specifies that it already has a copy of the packet from a previous transmission, then the "blackout" period is only the time and length of the "null" Data transmission.

If a CTS is heard from a station that this station currently has a CTS (and RTR) scheduled to be transmitted to, it means that the transmitting station is now servicing a higher priority RTS and will not be able to service this station's requests. In this case, cancel the CTS (and RTR).

In single channel systems only, if no CTS messages are received during the CTSwait period then the station should retry the RTS message.

The Ready to Receive (RTR) message is used only in multi-channel systems and is transmitted only on the selected data channel.

The receiving station notes the information returned in the RTR (in response to its RTS). At the end of the CTSwait period it decides on a target station (lowest cost to destination or randomly) and sends the data packet to the chosen station.

If the transmitting station RTR message specifies that it already has a copy of the packet (or packets from the same message) from a previous transmission, then it will be notified to queue and transmit it/them via a "null" data transmission.

Action by non-targeted receiving stations should be rare, and should be ignored.

If no RTR messages are received during the CTSwait period then the station should switch back to the probing channel and retry the RTS message.

If the data message received by the targeted station contains a data packet then the station places the packet in its message queue and immediately transmits an ACK back to the transmitting station on the same data channel as the packet was received on. If the data message is a "null" message then the retained data packet/s are moved to the message queue and an ACK is transmitted back to the transmitting station.

If the data message contains a data packet then non-targeted stations receiving it should retain the packet in the Retained packet list if their cost to destination is lower than the transmitting station's cost to destination. If the Data message is a "null" Data message, it can be ignored.

For the source station, the data packet is marked in the message queue as "Sent". For other stations, the data packet is moved from the message queue to the Retained Packet list (in case of an ETE-NAK later).

If a copy of the ACKed data packet has been retained in the Retained packet list by a non-targeted receiving station, it should be discarded.

If no ACK message is received from the station that the previous data transmission was targeted at, then the station should revert to the probing channel (if applicable) and wait and listen for a period no less than the transmission time of an RTS message plus an additional random time and then retry the RTS message. The wait and listen period is to allow other stations to transmit RTS messages of their own.

When the source station receives the ETE ACK packet, it can release the gradient to/from destination. It should also discard all data packets for the specified message from the message queue. Other receiving stations should queue the message for transmission to the source station as with normal data packets. If any data packets in the Retained Packet list are part of the specified message, they should be dropped.

If neither an applicable ETE ACK nor an ETE NAK is received by source receiving stations before the time-to-live of the packets in a message expires (plus a suitable wait period for a potential ETE NAK to arrive), then all packets in that message are rescheduled for retransmission.

When the source station specified in the message receives an End-to-End NAK message, it must reschedule the missing data packets for transmission.

If a non-source receiving station has a copy of any of the missing data packets in its Retained packet list, that packet is moved to the message queue and the missing packet references are removed from the ETE NAK message. The ETE NAK message is queued for transmission to the source station as with normal data packets unless no missing packet references remain in the message, in which case the ETE NAK message is discarded.

If neither an applicable ETE ACK nor an ETE NAK is received before the time-to-live of the packets in a message expires (plus a suitable wait period for a potential ETE NAK to arrive), then reschedule all packets in that message for retransmission.

The general data transport algorithm is designed to broadcast a message of one or more packets to all stations in the network with a minimum overhead. The basic algorithm does not necessarily use ETE or other acknowledgement and hence it is not guaranteed that all stations on a list will receive all packets. The algorithms for peer-to-peer data transport, as described above, are used, with some modification. A new RFP (Request For Packets) message is defined.

Parameters nRTSPackets: the maximum number of packets reported in the Packets Available range for the RTS message. Typically this would be around 10.

nRTSAttempts: the number of attempts at sending RTS without receiving CTS replies before a transmitting station stops transmitting a range of packets. Typically this would be 2 or 3.

The data structures are the same as before, with the following additional fields:

RTS

Broadcast status. This is a Boolean value that specifies that the data to be sent is to be broadcast.

Packets available range. A range of packets that the transmitting station is offering. These are all packets in the given message.

ETE required. True if the originating station requires stations on the network to send an ETE acknowledgement when the broadcast message is completely received.

RFP

Range or list of missing packets.

Message ID.

CTS

Packets required. This is a list of packet numbers (from the range given in the RTS) that the station does not yet have.

RTR

Packets required. This is a list of packet numbers (from the range given in the RTS) that the station does not yet have.

The originating station breaks the message up into one or more packets as usual. All the packets are given an infinite, or fairly large, time-to-live. The first nRTSPackets packet numbers are then transmitted in an RTS message (with the broadcast status on). Also increase the maximum number of hops to a large number.

All listening neighbor stations that have not yet received one or more packets in the range specified in the RTS, transmit back a CTS (and possibly RTR in the comprehensive algorithm case) containing the numbers of any missing packets. If all packets have previously been received, the station does not reply to the RTS.

At the end of the CTSWait period, the transmitting station finds the most requested packet number from the CTS messages received and transmits that packet in a DATA transmission. Stations listening for DATA either accept or reject that DATA. No ACK is generated by receiving stations. The transmitting station continues transmitting the RTS with the same range of packets until no CTS replies are received for nRTSAttempts. At this point, the station moves on to the next range of nRTSPackets packets and starts the above procedure over. This continues until all packets are sent.

A receiving station receives packets until it has built up a continuous range of nRTSPackets packets. At this point it starts retransmitting that range of packets as described above.

In a perfect world this would get all packets to all stations on the network. However, there are no guarantees. Stations appearing on the network during this broadcast procedure might not receive earlier packets. For this reason a new message type (RFP) is used to request missing data.

If a receiving station receives an RTS broadcast message and it does not already have all message packets with numbers before the range specified in the RTS, then it schedules an RFP message containing information on the missing packet/s.

If a receiving station hears such an RFP message and has one or more of the missing packets then it schedules RTS broadcast messages, as above, containing the missing packet range.

If the originating station has a list of all stations on the network, it can set the ETE Required bit in the RTS. In this case that bit is rebroadcast with each RTS. When a station has received all packets in the message, it transmits an ETEACK back to the originating station.

Note that stations in the network should retain the broadcast message when it is complete, in case an RFP should be received later.

The algorithm above specifies setting the TTL and maximum number of hops to a large or infinite number. This has the effect of allowing a broadcast to disseminate indefinitely until all stations within a connected network have received the broadcast. This might not be optimal for various reasons:

a. The high TTL (time to live) means that broadcast messages will effectively have very low priority. If a station is very busy (e.g. a gateway station) then the broadcast packets might take a long time to be transmitted.

b. The broadcast might only be aimed at a subset of the entire network, clustered physically close to the broadcast source (e.g. an emergency alert for a specific area of a city)

c. The broadcast might only be relevant to a subset of the stations in the network (e.g. an update only relevant to a particular brand of hardware)

The solution to (a) would be to give broadcast packets a normal time to live, but reset the TTL back to the original value on each hop. Hence, at each station, the packet would start out with a low priority, but rapidly move to the head of the queue for transmission.

The solution to (b) would be to limit the maximum number of hops as with normal peer-to-peer messages.

The solution to (c) would be to be able to partition the stations into sets via, say, the unique station ID. If, say, a number of bits in the station ID were manufacturer/model dependent, then that information could be used to identify whether or not a station is relevant to the broadcast. If such stations were the only ones that should be concerned with broadcasting, then other stations could ignore such broadcasts.

This does mean that if the specified station type is sparsely located in the network, there is a good chance that such stations would not hear broadcasts from other such stations. A better plan might be to allow broadcasting via all station types, but each station examines the message to see whether it should react to that message, or just re-broadcast it.

Appendix A

Parameters

Psize: Packet size (bits). Maximum length of a data packet to be sent in one transmission (excluding overhead data). If a message block is longer than Psize then the block is broken into two or more packets. Psize should be chosen for the slowest data rate.

Pmax: Maximum number of packets for Slow Switching transmission. If the number of packets waiting to be transferred via a particular neighbor is Pmax or fewer, then the packets are transmitted on the probing channel. If the number of packets exceeds Pmax, the data is transmitted on a data channel. (Slow Switching algorithm only)

TTL: Message Time-to-Live (msec): Time-to-live for packets in a message. A packet's time-to-live is initially set to TTL when it is generated. If a packet's time-to-live drops to zero before delivery to its destination, it is discarded (it is assumed that other mechanisms described here will force retransmission of the discarded packet if necessary).

Tnak: Message Time to NAK (msec). Less than TTL. After this time, if a packet at the destination reaches this age, an End-to-End NAK will be generated to retrieve missing packets.

CTSwait: Time to wait to collect CTS messages from neighbors after transmitting an RTS (msec). Once this period is over, the station transmitting the RTS decides on its target neighbor based on CTS information received. (Comprehensive algorithm only)

Tretain: Time to retain non-targeted data packets in the Retained packet list (msec). (Comprehensive algorithm only)

Tack: Maximum time to wait for an ACK after transmitting a Data message (msec).

Data Structures

Message Queue

Consists of an entry for each data packet awaiting transmission, ACK or ETE ACK/NAK.

Entry consists of:

Data Packet, including source ID, packet ID, Time-to-live

Status: One of: Awaiting transmission, Awaiting CTS, Awaiting ACK, Awaiting ETE ACK/NAK Retained Packet List (Comprehensive Algorithm Only)

Consists of an entry for each retained (non-targeted) data packet.

Entry consists of:

Data Packet, including source ID, packet ID, Time-to-live

Time that data packet was retained.

Blackout Period List (Comprehensive Algorithm Only)

Contains an entry for each period during which a known Data transmission is scheduled and whether that known transmission will interfere with reception or will potentially be interfered with by transmissions.

The rules are:
  a. If a station A hears a CTS (on the probing channel) from station B then that CTS will define a time, duration and channel for a (possible) subsequent DATA transmission to station B. Station A must not transmit anything during that time on that channel in order to avoid interfering with the projected transmission to station B. This is a Transmit blackout.
  b. If a station A hears an RTS (on the probing channel) from station B then that RTS will define a time, duration and channel for a (possible) subsequent DATA transmission from station B. Station A must avoid scheduling any receptions during that time (i.e. must not respond to other RTS messages if the scheduled time overlaps) to avoid interference. This is a Receive blackout.

Entry consists of:

Transmit/Receive. Specifies whether this is a Transmit or Receive blackout.

Start time (relative to station clock)

Duration of transmission (msec).

Target station ID of transmission for Transmit blackouts or Transmitting station ID for Receive blackouts.

Transmit channel.

Off Channel Time (Comprehensive Algorithm Only)

This is a variable that specifies that this station will be "off channel" during a specified period of time (i.e. will be listening on a data channel rather than the probing channel). Not applicable if a single channel is being used for both the probing and data channel.

Transmitted Message Formats

All messages start with the usual Transmitting station ID, Transmit power and Transmit station noise floor for the channel on which the message is being transmitted. This information is used to identify the transmitter and update entries in the neighbor table (see Slow Probing document), although none of these messages should be used to create new neighbors—that task is restricted only to neighbor (slow) probe messages.

Each message also contains a field specifying the Cost Function ID. This will determine which gradient table is used to route messages (see the Fast Probing document for more information). Typically this Cost Function ID is chosen when the message is generated in order to control Quality of Service (QoS) for that message type. Subsequently derived messages (e.g. ACKs, RTS, etc.) will inherit the same Cost Function ID as the originating message.

Note: In multi-channel systems, only the messages sent on the probing channel should be used to update the neighbor table entries. Messages on data channels (RTR, DATA, ACK) should not update the neighbor table information.

RTS

Comprehensive Algorithm

Unique message ID of data packet to be transmitted.

Originating station ID of data packet to be transmitted.

Packet number of data packet to be transmitted.

(Note: the unique message ID (unique to originating station), together with the originating station ID and packet number, uniquely identifies the packet within the system)

Destination station ID of data packet to be transmitted.

Data packet time-to-live.

Data packet random number*.

Data packet transmit size.

Data packet transmit time (projected).

Data transmit channel.

Noise floor of data transmit channel.

Cost to packet destination of transmitting station. (Note: if the gradient for the destination is frozen, send $C_{DF}$ rather than $C_D$)

* This random number would typically be a short (8-bit) random integer, generated for this RTS message from a random number generator, initially seeded with (say) the station's unique ID at startup. This number is used to prioritise two RTS messages with equal time-to-live data, as explained below.

Abbreviated Algorithm

Unique message ID of data packet to be transmitted.

Originating station ID of data packet to be transmitted.

Packet number of data packet to be transmitted.

(Note: the unique message ID (unique to originating station), together with the originating station ID and packet number, uniquely identifies the packet within the system)

Destination station ID of data packet to be transmitted.

Data packet time-to-live.

Data packet transmit size. (only necessary to avoid buffer overflow at target station)

Data transmit channel.

Noise floor of data transmit channel.

Cost to packet destination of transmitting station. (Note: if the gradient for the destination is frozen, send $C_{DF}$ rather than $C_D$)

Slow Switching Algorithm

Same as Abbreviated algorithm

CTS

Comprehensive Algorithm

Targeted station ID (station that sent the RTS)

(Note: Since the CTS is targeted at a station that just sent an RTS and is waiting for CTS replies, no other information is required in the CTS message to identify the data packet that is to be transmitted.)
Data packet transmit size.
Data packet transmit time (projected).
Data transmit channel.
  If the system is a single channel one (probing and data on the same channel) then the following fields are also necessary (since RTR will not be used):
Cost to packet destination of the transmitting station. (Note: if the gradient for the destination is frozen, send CDF rather than CD)
A flag that specifies that the transmitting station already has a copy of the data packet in its Message queue or Retained Packet list.
A list of packet numbers from the same message which are already resident in its Message queue or Retained Packet list.
Abbreviated Algorithm
No additional data is required.
Slow Switching Algorithm
Same as Abbreviated algorithm
RTR
Comprehensive Algorithm
Targeted station ID (station that sent the RTS)
Cost to packet destination of the transmitting station. (Note: if the gradient for the destination is frozen, send $C_{DF}$ rather than $C_D$)
A flag that specifies that the transmitting station already has a copy of the data packet in its Message queue or Retained Packet list.
Abbreviated Algorithm
Not applicable
Slow Switching Algorithm
Not applicable
Data
Comprehensive Algorithm
Targeted station ID (station that sent the CTS and that was chosen as target)
Originating station ID of data packet*.
Destination station ID of the data packet*.
Unique message ID of data packet to be transmitted*.
Packet number of data packet*.
Total packets in message (Nmsg)
Data packet time-to-live*.
  Either the data packet, or a special "null" flag to tell the receiving station to accept and pass on the data packet that it previously received.
  If this is a "null" message, then include a list of packet numbers for the receiving station to pass on.
Note: The items marked * are not strictly necessary, since they can be recalled from the original RTS message.
Abbreviated Algorithm
Originating station ID of data packet*.
Destination station ID of the data packet*.
Unique message ID of data packet to be transmitted*.
Packet number of data packet*.
Total packets in message (Nmsg)
Data packet time-to-live*.
The data packet.
Note: The items marked * are not strictly necessary, since they can be recalled from the original RTS message.
Slow Switching Algorithm
Same as Abbreviated algorithm
ACK
Comprehensive Algorithm
Targeted station ID (station that sent the data packet)
Abbreviated Algorithm
No additional data is required.
Slow Switching Algorithm
No additional data is required
End-To-End ACK
  This is a single packet message with a special flag signifying that it's an ETE ACK. It is targeted at the data message source station. The message packet itself contains:
Unique message ID of message that was successfully received at the destination.
End-To-End NAK
  This is a short message with a special flag signifying that it's an ETE NAK. It is targeted at the data message source station. The message packet itself contains:
Unique message ID of message that was unsuccessfully received at the destination.
A list of packet numbers that were not received successfully.

We claim:

1. A communication network comprising a plurality of stations each able to transmit and receive data so that the network transmits a message comprising a plurality of data packets from an originating client station to a destination client station via at least one opportunistically selected intermediate station, the network being operable to:
define, at each station, at least one probing channel;
select, at each station, a probing channel for the transmission of probe signals to other stations;
transmit neighbor gathering probe signals from each station on the selected probing channel, other neighboring stations which receive the neighbor gathering probe signals from a probing station responding directly or indirectly to thereby indicate to other stations their availability as destination or intermediate stations;
wherein each station is operable to:
  transmit on the selected probing channel, from a station with data to send, to other neighboring stations that have indicated to the station with data to send their availability as destination or intermediate stations, a data transport signal comprising a Request to Send message indicating the need to send data to a particular destination station or stations;
  transmit on the selected probing channel, from one or more neighboring stations that have indicated to the station with data to send their availability as destination or intermediate stations and that receive the Request to Send message, to the station with data to send, a data transport signal comprising a Clear to Send message including information indicating said neighboring station's availability as a destination or intermediate station and its ability to forward the data to the particular destination station or stations as indicated in the Request to Send message;
  select opportunistically, at the station with data to send, one or more neighboring stations that transmitted a Clear to Send message based on at least one criterion using information in their Clear to Send messages, and transmit at least one data packet to said one or more selected neighboring station or stations; and
  transmit, from the selected neighboring station receiving the data packet, a Packet Acknowledge message to the station with data to send, to confirm successful reception of the data packet.

2. A communication network according to claim 1, wherein the network further is operable to transmit, from a destination station successfully receiving all data packets of a message from the originating station, an End-to-End Acknowledge message to the originating station, directly or via one or more intermediate stations, to confirm receipt of said data packets.

3. A communication network according to claim 2 wherein each originating station is adapted to retain all the data packets of the message until the originating client station receives the End-to-End Acknowledge message to the destination station.

4. A communication network according to claim 2 wherein each destination station is adapted to retain the all the data packets of the message until the destination station Transmits the End-to-End Acknowledge message to the origining station.

5. A communication network according to claim 1 wherein each station with data to send is adapted to retain said at least one data packet until the station with data to send has transmitted said at least one data packet to the selected station and until the selected station confirms successful reception of the transmitted data packet.

6. A communication network according to claim 5 wherein each station transmitting data transport signals comprising Clear to Send messages is adapted to include in the Clear to Send message information on a data packet it has retained at a station with data to send.

7. A communication network according to claim 1 wherein any neighbouring station receiving a data packet, transmitted from the station with data to send to a selected neighbouring station that transmitted a Clear to Send Message, is operable to retain said data packet for subsequent onward transmission if the said station receiving the data packet has a lower cost to destination value than the station with data to send, and to identify any such retained data packets in subsequent Clear to Send messages of its own.

8. A communication network according to claim 1 wherein the Clear to Send message defines a data channel, a time and a duration for a possible data transmission, the network being operable so that any station receiving a Clear to Send message, transmitted from a neighbouring station that has indicated its availability as a destination or intermediate station to a probing station, does not make transmissions on the data channel defined in the Clear to Send message, at the time and for the period defined in the Clear to Send message, thereby to avoid interfering with said possible data transmission.

9. A communication network according to claim 1 wherein the Request to Send message defines a data channel, a time and a duration for a possible data transmission, the network being operable so that any station receiving a Request to Send message, transmitted from a neighbouring station that has data to send, does not schedule reception of data messages on the data channel defined in the Request to Send message, at the time and for the period defined in the Request to Send message, thereby to avoid interfering with said possible data transmission.

10. A method of operating a communication network comprising a plurality of stations each able to transmit and receive data so that the network can transmit a message comprising a plurality of data packets from an originating station to a destination station via at least one opportunistically selected intermediate station, the method comprising:
   defining at least one probing channel;
   selecting, at each station, a probing channel for the transmission of probe signals to other stations;
   transmitting neighbour gathering probe signals from each station on the selected probing channel, other neighboring stations which receive the neighbor gathering probe signals from a probing station responding directly or indirectly to thereby indicate to other stations their availability as destination or intermediate stations;
   transmitting on the selected probing channel, from a station with data to send, to other neighboring stations that have indicated to the station with data to send their availability as destination or intermediate stations, a data transport signal comprising a Request to Send message indicating the need to send data to a particular destination station or stations;
   transmitting on the selected probing channel, from one or more neighboring stations that have indicated to the station with data to send their availability as destination or intermediate stations and that receive the Request to Send message, to the station with data to send, a data transport signal comprising a Clear to Send message, including information indicating the extent of each said neighboring station's availability as a destination or intermediate station and its ability to forward the data to the particular destination station or stations as indicated in the Request to Send message;
   selecting opportunistically, at the station with data to send, one or more neighboring stations that transmitted a Clear to Send message based on at least one criterion using information in their Clear to Send messages, and transmitting at least one data packet to said one or more selected neighboring station or stations; and
   transmitting, from each selected neighboring station receiving said at least one data packet, a Packet Acknowledge message to the station with data to send to confirm successful reception of the data packet.

11. A method according to claim 10 which includes transmitting, from a destination station successfully receiving all data packets of a message from an originating station, an End-to-End Acknowledge message to the originating station, directly or via one or more intermediate stations, to confirm receipt of said data packets.

12. A method according to claim 11 which includes retaining, by the originating station, all the data packets of the message until the originating station receives the End-to-End Acknowledge message from the destination station.

13. A method according to claim 11 which includes retaining, by the destination station, all the data packets of the message until the destination station transmits the End-to-End Acknowledge message to the originating station.

14. A method according to claim 10 which includes retaining, by each station with data to send, said at least one data packet until the station with data to send has transmitted said at least one data packet to the selected station and until the selected station confirms successful reception of the transmitted data packet.

15. A method according to claim 14 which includes transmitting, with each Clear to Send message sent by a station transmitting data transport signals, information on a data packet it has retained as a station with data to send.

16. A method according to claim 10 wherein the Request to Send message includes a cost to destination value for the data to be sent, only stations with a lower cost to destination value to the specified destination station or stations responding with a Clear to Send message.

17. A method according to claim 16 wherein each Clear to Send message includes cost to destination values for the specified destination station or stations, the station with data to send selecting one or more stations to transmit data to, based on the indicated cost to destination values in the Clear to Send messages, among other criteria.

18. A method according to claim 10 wherein any neighbouring station receiving a data packet, transmitted from the station with data to send to a selected neighbouring station that transmitted a Clear to Send Message, retains said data packet for subsequent onward transmission if the said station receiving the data packet has a lower cost to destination value than the station with data to send, and identifies any such retained data packets in subsequent Clear to Send messages of its own.

19. A method according to claim 10 wherein the Clear to Send message defines a data channel, a time and a duration for a possible data transmission, and in that any station receiving a Clear to Send message, transmitted from a neighbouring station that has indicated its availability as a destination or intermediate station to a probing station, does not make transmissions on the data channel defined in the Clear to Send message, at the time and for the period defined in the Clear to Send message, thereby to avoid interfering with said possible data transmission.

20. A method according to claim 10 wherein the Request to Send message defines a data channel, a time and a duration for a possible data transmission, and in that any station receiving a Request to Send message, transmitted from a neighbouring station that has data to send, does not schedule reception of data messages on the data channel defined in the Request to Send message, at the time and for the period defined in the Request to Send message, thereby to avoid interfering with said possible data transmission.

21. A communication network comprising a plurality of stations each able to transmit and receive data so that the network can transmit a message comprising a plurality of data packets from an originating station to a destination station via at least one opportunistically selected intermediate station, the network being operable to:
   define, at each station, at least one probing channel and at least one data channel;
   select, at each station, a probing channel for the transmission of probe signals to other stations;
   transmit neighbor gathering probe signals from each station on the selected probing channel, other neighboring stations which receive the neighbor gathering probe signals from a probing station responding directly or indirectly to thereby indicate to the other stations their availability as destination or intermediate stations;
   wherein each station is operable to:
      transmit on the selected probing channel, from a station with data to send, to other neighboring stations that have indicated to the station with data to send their availability as destination or intermediate stations, a data transport signal comprising a Request to Send message indicating the need to send data to a particular destination station or stations;
      transmit on the selected probing channel, from one or more neighboring stations that have indicated to the station with data to send their availability as destination or intermediate stations and that receive the Request to Send message, to the station with data to send, a Ready to Receive message on a selected data channel, the Ready to Receive message including information indicating said neighboring station's availability as a destination or intermediate station;
      select opportunistically, at the station with data to send, one or more neighboring stations that transmitted a Ready to Receive message based on information in their Ready to Receive messages, and transmit at least one data packet to said one or more selected neighboring station or stations on the selected data channel; and
      transmit, from the selected neighboring station receiving the data packet, a Packet Acknowledge message to the station with data to send, to confirm successful reception of the data packet.

22. A communication network according to claim 21 which is operable to transmit, from a station receiving a Request to Send message to the station with data to send, a data transport signal on the selected probing channel comprising an initial Clear to Send message, said initial Clear to Send message including data relating to the selected data channel for transmission of subsequent Ready to Receive messages and data.

23. A communication network according to claim 21 wherein each station is operable to include data indicative of path loss and/or noise on the selected data channel in Ready to Receive messages transmitted to the station with data to send, thereby to enable the station with data to send to calculate the transmit power required to transmit data packets successfully to a station from which a Ready to Receive message has been received.

24. A communication network according to claim 21 wherein each station is adapted to transmit Ready to Receive messages on the selected data channel at higher power and/or lower data rate than data messages on that channel.

25. A communication network according to claim 24 wherein the Ready to Receive messages have a higher probability of successful transmission than data messages.

26. A communication network according to claim 21 wherein each station is adapted to wait, after transmitting a Ready to Receive message, for a possible data message on the selected data channel for a period determined by information in the Request to Send message.

27. A method of operating a communication network comprising a plurality of stations each able to transmit and receive data so that the network can transmit a message comprising a plurality of data packets from an originating station to a destination station via at least one opportunistically selected intermediate station, the method comprising:
   defining at least one probing channel and at least one data channel;
   selecting, at each station, a probing channel for the transmission of probe signals to other stations;
   transmitting neighbour gathering probe signals from each station on the selected probing channel, other neighboring stations which receive the neighbor gathering probe signals from a probing station responding directly or indirectly to thereby indicate to other stations their availability as destination or intermediate stations;
   transmitting on the selected probing channel, from a station with data to send, to other neighboring stations that have indicated to the station with data to send their availability as destination or intermediate stations, a data transport signal comprising a Request to Send message indicating the need to send data to a particular destination station or stations;
   transmitting, from one or more neighboring stations that have indicated to the probing station their availability as destination or intermediate stations and that receive the Request to Send message, to the station with data to send, a Ready to Receive message on a selected data channel, the Ready to Receive message including information indicating the extent of each said neighboring station's availability as a destination or intermediate station;
   selecting opportunistically, at the station with data to send, one or more neighboring stations that transmitted a Ready to Receive message based on information in their Ready to Receive messages, and transmitting at least one data packet to said one or more selected neighboring station or stations on the selected data channel; and transmitting, from each selected neighboring station receiving said at least one data packet, a Packet Acknowledge message to the station with data to send to confirm successful reception of the data packet.

28. A method according to claim 27 wherein a station receiving a Request to Send message transmits, to the station with data to send, a data transport signal on the selected probing channel comprising an initial Clear to Send message, said initial Clear to Send message including data relating to the selected data channel for transmission of subsequent Ready to Receive messages and data.

29. A method according to claim 28 wherein each station includes data indicative of path loss and/or noise in Ready to Receive messages transmitted to the station with data to send on the selected data channel, thereby to enable the station with data to send to calculate the transmit power required to transmit data packets successfully to a station from which a Ready to Receive message has been received.

30. A method according to claim 27 wherein each station transmits Ready to Receive messages on the selected data channel at higher power than data messages on that channel.

31. A method according to claim 30 wherein the Ready to Receive messages have a higher probability of successful transmission than data messages.

32. A method according to claim 27 wherein each station waits, after transmitting a Ready to Receive message, for a possible data message on the selected data channel for a period determined by information in the Request to Send message.

* * * * *